United States Patent [19]

Sato

[11] Patent Number: 4,555,711

[45] Date of Patent: Nov. 26, 1985

[54] DEFLECTION CONTROL INK JET OPERATION ADJUSTMENT CONTROL

[75] Inventor: Tsutomu Sato, Yokohama, Japan

[73] Assignee: Ricoh Company, Ltd., Tokyo, Japan

[21] Appl. No.: 525,389

[22] Filed: Aug. 22, 1983

[30] Foreign Application Priority Data

Aug. 30, 1982 [JP] Japan ................................ 57-150390
Aug. 30, 1982 [JP] Japan ................................ 57-150392

[51] Int. Cl.[4] ................................ G01D 18/00
[52] U.S. Cl. ................................ 346/75
[58] Field of Search ................................ 346/75

[56] References Cited

U.S. PATENT DOCUMENTS 4,310,846 1/1982 Horike ................................ 346/75
4,417,256 11/1983 Fillmore et al. ................................ 346/75

*Primary Examiner*—E. A. Goldberg
*Assistant Examiner*—Gerald E. Preston
*Attorney, Agent, or Firm*—David G. Alexander

[57] ABSTRACT

A deflection control type ink jet recording apparatus is capable of automatically removing a failure in ink ejection. A condition set control is performed to set a predetermined charging and deflection condition for ink drops. If the condition set control fails to predetermine the desired condition, ink ejection is interrupted and, after a predetermined period of time, a second condition set control is performed. The interruption time of ink ejection is predetermined to be shorter than a predetermined period of condition set controls which occur during a print control, thereby shortening the down time when the condition setting operation is not successful.

2 Claims, 18 Drawing Figures

DEFLECTION CONTROL INK JET OPERATION ADJUSTMENT CONTROL

BACKGROUND OF THE INVENTION

The present invention relates to a deflection control type ink jet recording apparatus which is capable of automatically removing a failure in ink ejection.

There is known an ink jet recording apparatus of the type which ejects ink from a nozzle while applying vibration thereto, causes a charging electrode to selectively charge ink drops in a position where the ink from the nozzle separates into a drop, and allows deflection electrodes to deflect the charged ink drops toward predetermined positions on a sheet.

In an ink jet recorder of the type described, the ink continuously ejected from the nozzle separates into a string of drops having a predetermined size in the course of its flight away from the nozzle. The separation is attained by applying high frequency vibrations to ink fed under pressure to an ink ejection head. Means for applying such vibrations to ink generally comprises a flat or cylindrical electrostrictive vibrator. The ink drops are selectively charged in response to input video data and then passed through a predetermined deflecting electric field. This brings about a deflection in the path of each drop which is determined by the presence/absence of a charge thereon or a specific level of a charge. As a result, the drops impinge on certain positions on a sheet or collected by a gutter in accordance with the video data, thereby reproducing a desired image on the sheet. As well known in the art, charging in the art of ink jet recording utilizes the fact that ink breaks into a drop while maintaining at its front end a charge which has been developed by electrostatic induction due to the electric field developed by the charging electrode, the charge remaining on the separated ink drop.

The sheet is usually located at a relatively long distance from the ink ejection nozzle. Therefore, the ink pressure is designed high enough for an ink drop to stably fly as far as the sheet despite the influence of the charging and deflecting electric fields. Stable and accurate control over the ink viscosity and pressure, vibration pressure, charge amount, deflection electric field and the like is another important consideration in regularly forming drops of a predetermined size and causing them to accurately fly predetermined deflection paths. Further, adequate charging of drops is unattainable unless a charge voltage or pulse is applied precisely timed to the separation of a drop from the ink.

In light of the above, there has been employed a phase search before a record charge control in order to stabilize the ink to a predetermined pressure and a predetermined viscosity while predetermining a timing for the application of charge pulses. For the phase search, a contact or non-contact type charge detector electrode is connected to a charge detector circuit whose major components are an amplifier, an integrator and a comparator. A charging pulse having a short duration is applied to the charging electrode, and the phase of the charge pulse relative to the separation of an ink drop is sequentially shifted. When the charge detector circuit produces an output indicating "charged", the phase of the then appeared charge pulse is predetermined to be the adequate charging phase. Thereafter, the deflection is adjusted if necessary and a printout operation is initiated.

Now, the ink jet recorder discribed above is unable to operate in the expected manner if any air bubble or dust is present in the head at the initial stage of ink ejection. The amount of air bubbles in the ink depends a great deal on the ink supply cut-off time in the previous interruption of ink ejection or the time for which the recorder has been left unused. In such a situation, a proper charging phase and/or deflection amount cannot be preset resulting in error in the phase search and/or deflection setting. In response to the error, the ink ejection is suspended and the whole printer is maintained inoperable until the operator removes the faulty condition. Thus, the prior art ink jet printer is totally disabled if the ink ejection is inadequate at the sacrifice of running efficiency and labor required for maintenance.

SUMMARY OF THE INVENTION

It is therefore an object of the present invention to provide a deflection control type ink jet recording apparatus which increases the running efficiency while decreasing the manual work required for maintenance.

In order to achieve this object, the present invention provides a deflection control type ink jet recording apparatus which uses a microcomputer or like electronic control device which performs at least one of a phase search control and a deflection set control. By the phase search control, one of a phase of ink separation and a phase of charge pulses is predetermined relative to the other, while by the deflection set control at least one of a charge amount, an ink pressure and a deflection voltage is adjusted to cause an ink drop to follow a predetermined deflection path. If one cycle of phase shifts has failed to provide an adequate phase in the case of the phase search control, a second phase search control occurs after a predetermined period of time. If a predetermined number of times of parameter changes have failed to provide an adequate deflection in the deflection set control, a second deflection set control occurs after a predetermined period of time.

Generally, ink temperature and pressure, nozzle opening and the like are often varied gradually after the start of ink ejection until proper ink ejection characteristics are regained. As the condition set control is repeated in accordance with the present invention, the possibility that ink ejection be automatically brought into adequate conditions is great. This assigns a minimum of maintenance work to the operator.

The above and other objects, features and advantages of the present invention will become apparent from the following detailed description taken with the accompanying drawings.

DESCRIPTION OF THE PREFERRED EMBODIMENT

While the deflection control type ink jet recording apparatus of the present invention is susceptible of numerous physical embodiments, depending upon the environment and requirements of use, a substantial number of the herein shown and described embodiment have been made, tested and used, and all have performed in an eminently satisfactory manner.

Figure 1A:
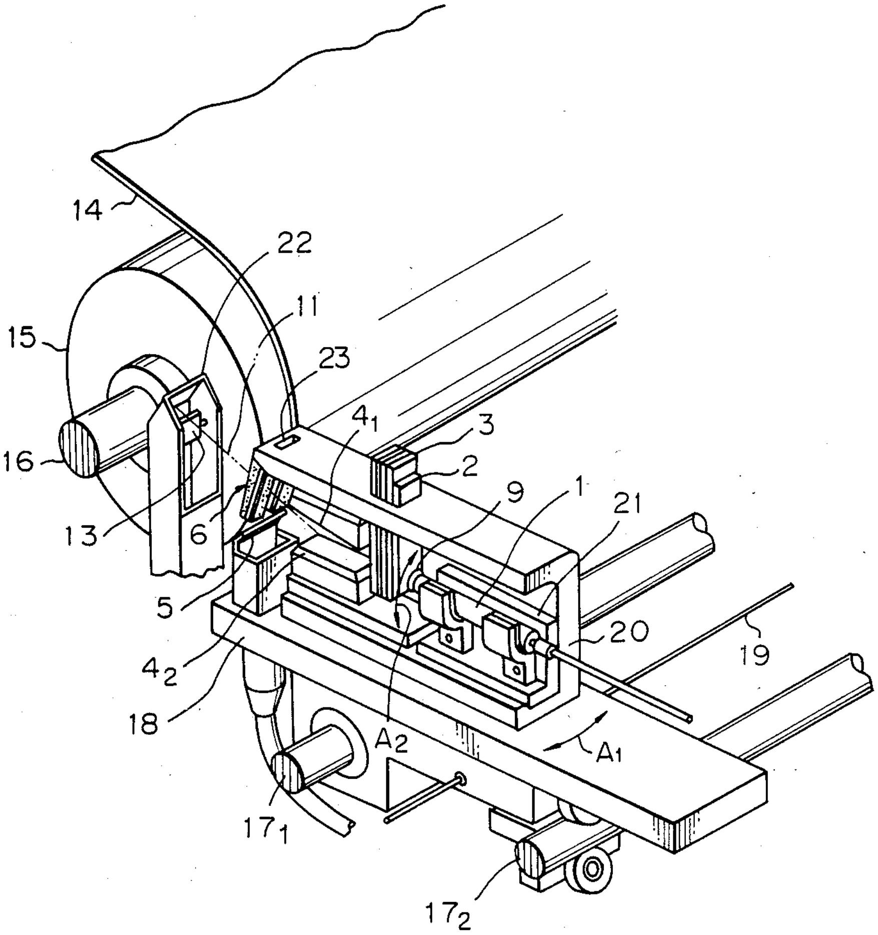
FIG. 1*a* is a perspective view of essential part of a deflection control type ink jet recorder embodying the present invention.
Figure 1B:
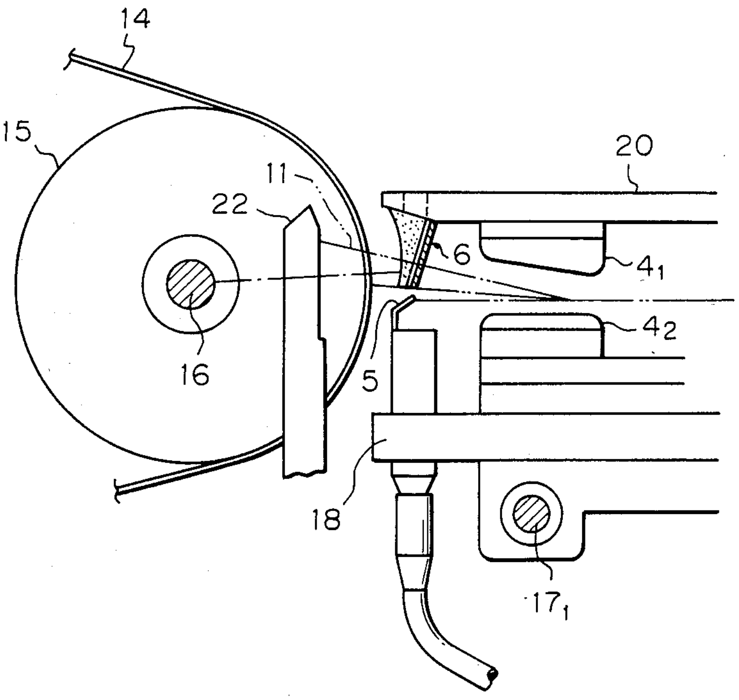
FIG. 1*b* is a side elevation of the ink jet recorder shown in FIG. 1*a;*

Referring to FIGS. 1*a* and 1*b*, essential part of an ink jet printer in accordance with one embodiment of the present invention is shown. A sheet 14 is passed over a platen 15 which has a shaft 16. A pair of guide bars $17_1$ and $17_2$ extend in parallel to the shaft 16 of the platen 15, while a carriage 18 is mounted on the guide bars $17_1$ and $17_2$ to reciprocate therealong. Although not shown in the drawings, a main scan or drive mechanism drives the carriage 18 through a wire 19 from the illustrated home position to the right in FIG. 1*a* and, at the outside of the right-hand sheet edge, returns it to the left.

A head assembly support base 20 is pivotted to the carriage 18 so that its position may be adjusted by a mechanism (not shown) angularly relative to the upper surface of the carriage 18 as indicated by a double-headed arrow $A_1$. A head base 21 is pivotted to the head assembly support base 20 so that its position may be adjusted by a mechanism (not shown) angularly relative to the upright surface of the base 20 as indicated by a double-headed arrow $A_2$. The head base 21 rigidly carries therewith an ink ejection head 1 which comprises a tubular metal member and a cylindrical electrostrictive vibrator rigidly fit on the metal tube. A nozzle plate having an ejection port is securely mounted on the front end of the metal tube of the head 1. Rigidly mounted on the head assembly support base 20 are a charging electrode plate 2, a shield electrode plate 3, deflection electrodes $4_1$ and $4_2$ and a shield electrode plate 6. A gutter 5 is securely mounted on the carriage 18 in order to catch non-printing ink droplets.

As shown in FIG. 1*b*, the shield electrode unit 6 faces the sheet 14 at its surface which is curved to have a center defined by the axis of the platen shaft 16. Stated another way, the shield electrode unit 6 is spaced an equal distance from the sheet over the entire surface concerned.

Figure 2:
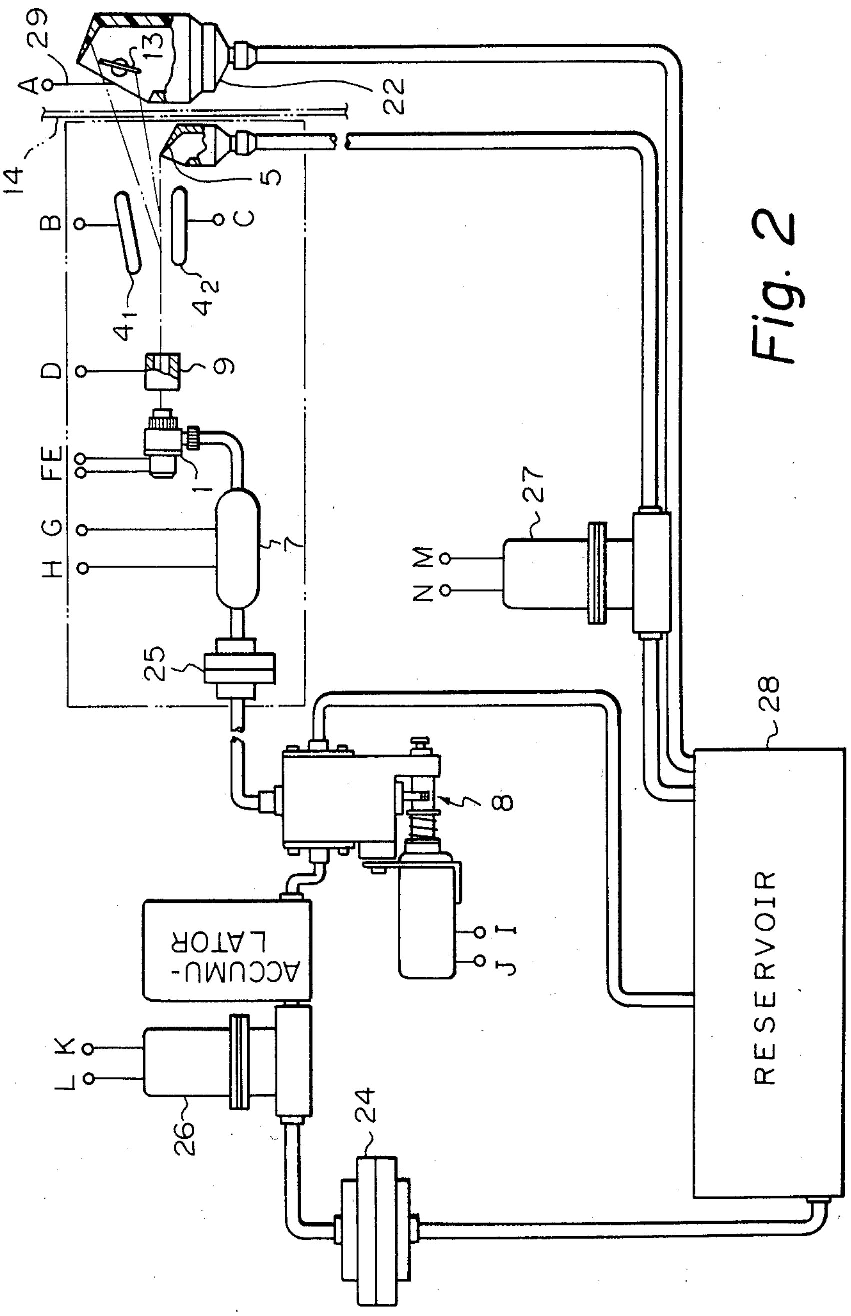
FIG. 2 is a system diagram outlining an ink supply line and an ink circulation line associated with the recorder of FIG. 1*a;*
Figure 3:
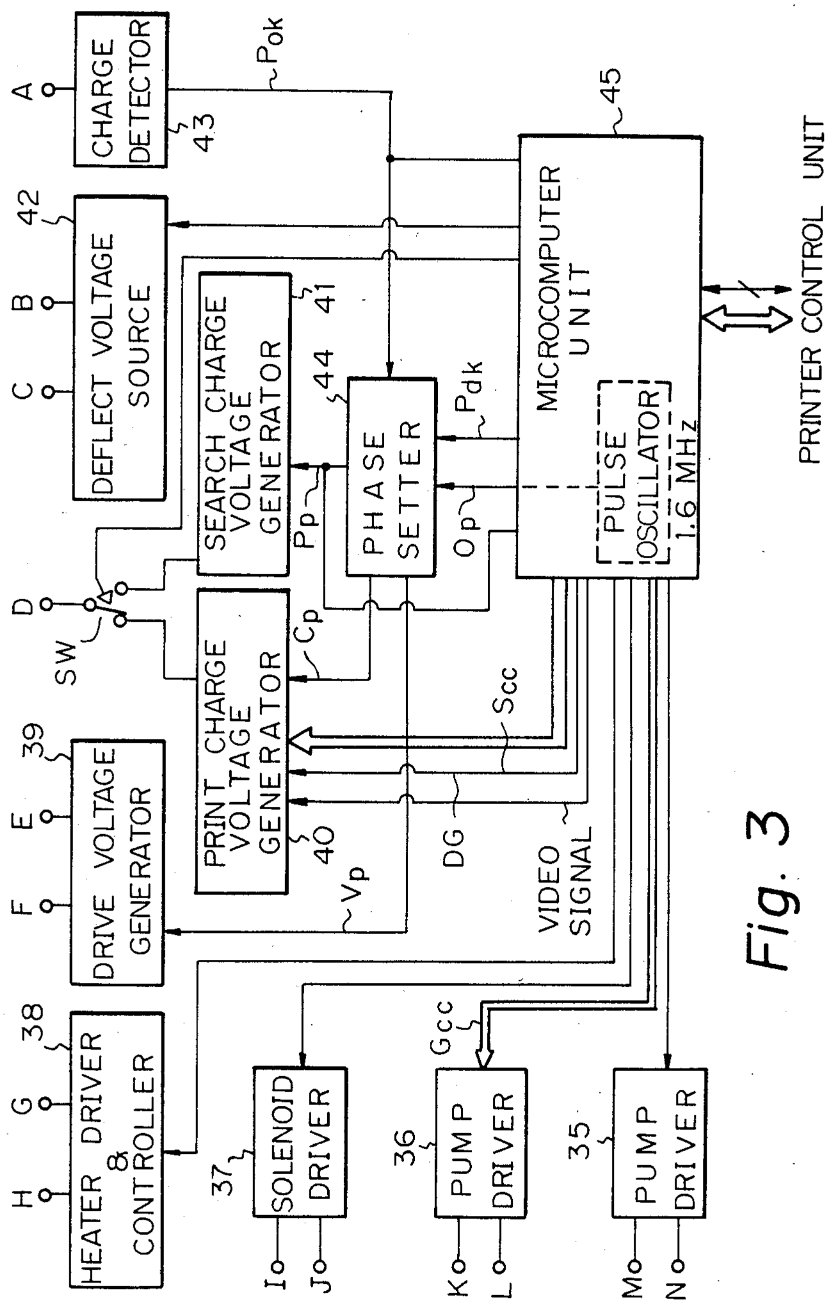
FIG. 3 is a block diagram of an electrical arrangement installed in the recorder of FIG. 1.

The ink jet printer described above has an ink supply system shown in FIG. 2 and an electric control system shown in FIG. 3. In FIG. 2, ink in a reservoir 28 is compressed by a pump 26 to be fed under pressure to an accumulator 4 through a filter 24, the accumulator 4 absorbing pressure variations due to the operation of the pump 26. The ink under constant pressure is routed to the head 1 via a solenoid-operated valve 8, a filter 25 and a heater 7.

In the head 1, the ink undergoes pressure variations with a constant frequency due to the constant frequency operation of the electrostrictive vibrator. Therefore, the ink ejected from the nozzle of the head 1 forms a drop at a position spaced a predetermined distance from the nozzle front. At this position, a charging electrode 9 is located and rigidly mounted on the plate 2. When the charging electrode 9 is supplied with a charge pulse at the instant of separation of a drop from the ink, it charges the drop to a polarity opposite to a polarity of the charge pulse. The deflection electrodes $4_1$ and $4_2$ develop therebetween a deflecting electric field in order to deflect the charged ink droplet along a predetermined path. If the head 1 is in a print position, the deflected drop will impinge on the sheet 14 and, if it is in the home position, the deflected drop will fly toward a gutter 22. Non-charged drops, on the other hand, are always directed toward the gutter 5, whether or not the head is in the home position. Thus, the members enclosed by a dash-and-dots line in FIG. 2, from the filter 25 to the gutter 5, are commonly mounted on the carriage 18, while the gutter 22 is so positioned as to capture charged ink drops when the carriage 18 is in the home position. While the carriage 18 is in the home position, the path of flight of drops misses the edge of the sheet 14 so that charged drops are caught by the gutter 22.

The ink in the gutter 5 is returned by a pump 27 to the reservoir 28. The ink in the gutter 22, on the other hand, is automatically returned to the reservoir 28 by gravity. To stop ink ejection, the pump 26 and heater 7 are deactivated, then the solenoid of the valve 8, then the pump 27. Under this condition, the valve 8 interrupts the communication between the accumulator 4 and the filter 25 while communicating the filter 25 to the reservoir 28. Disposed inside the gutter 22 is a flat charge detection electrode 13 which is insulated from the gutter 22. A shield wire 29 extends out from the electrode 13.

Figure 4:
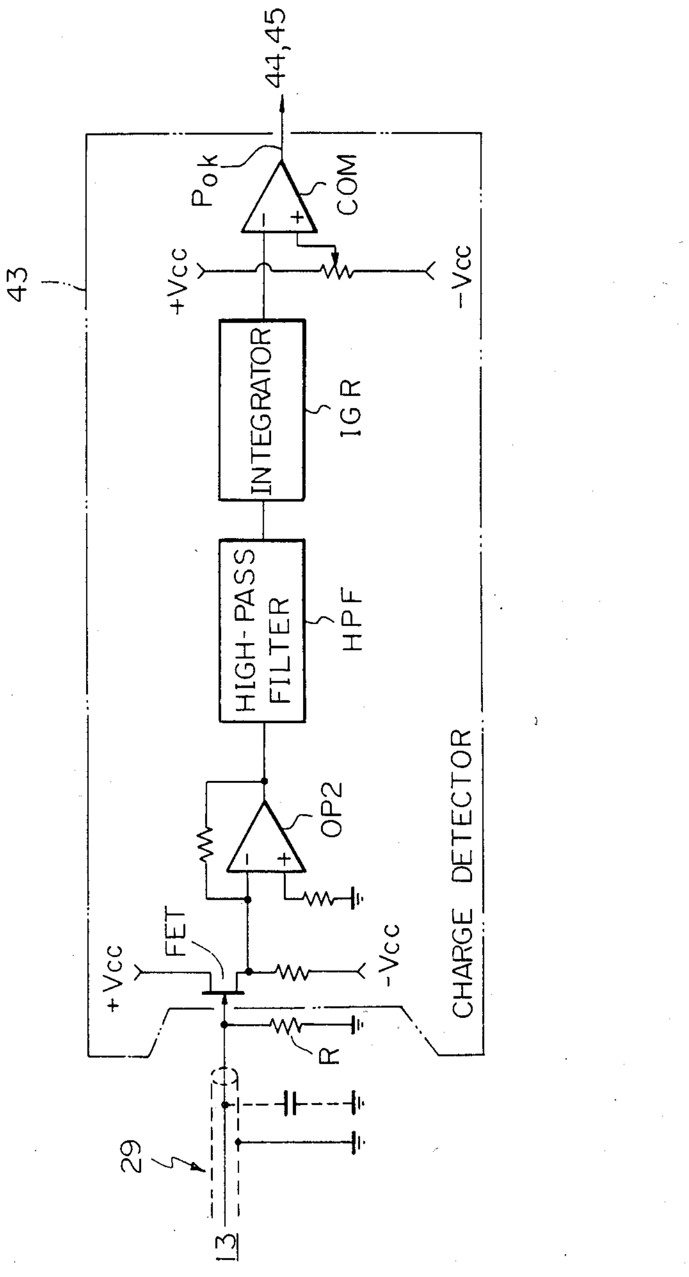
FIG. 4 is a block diagram of a charge detector circuit included in the construction of FIG. 3.

Referring to FIG. 4, a charge detection circuit 43 included in the construction of FIG. 3 is shown in detail. A resistor R for voltage conversion is connected between the core of the shield wire 29 and ground. The resistor R has a resistance $R_c = 100\ k\Omega$ which is smaller than an insulation resistance $R_g$ between the electrode 13 and ground, so that the resistance $R_g$ may be prevented from rendering the charge detection unstable despite its possible changes due to smearing on the inner walls of the gutter 22. The core of the shield wire 29 connects to the charge detector 43 which comprises a field effect transistor FET having a high input impedance, an operational amplifier (op amp) $OP_1$, a high-pass filter HPF, an integrator IGR for smoothing a DC component, and a comparator COM.

Figure 5:
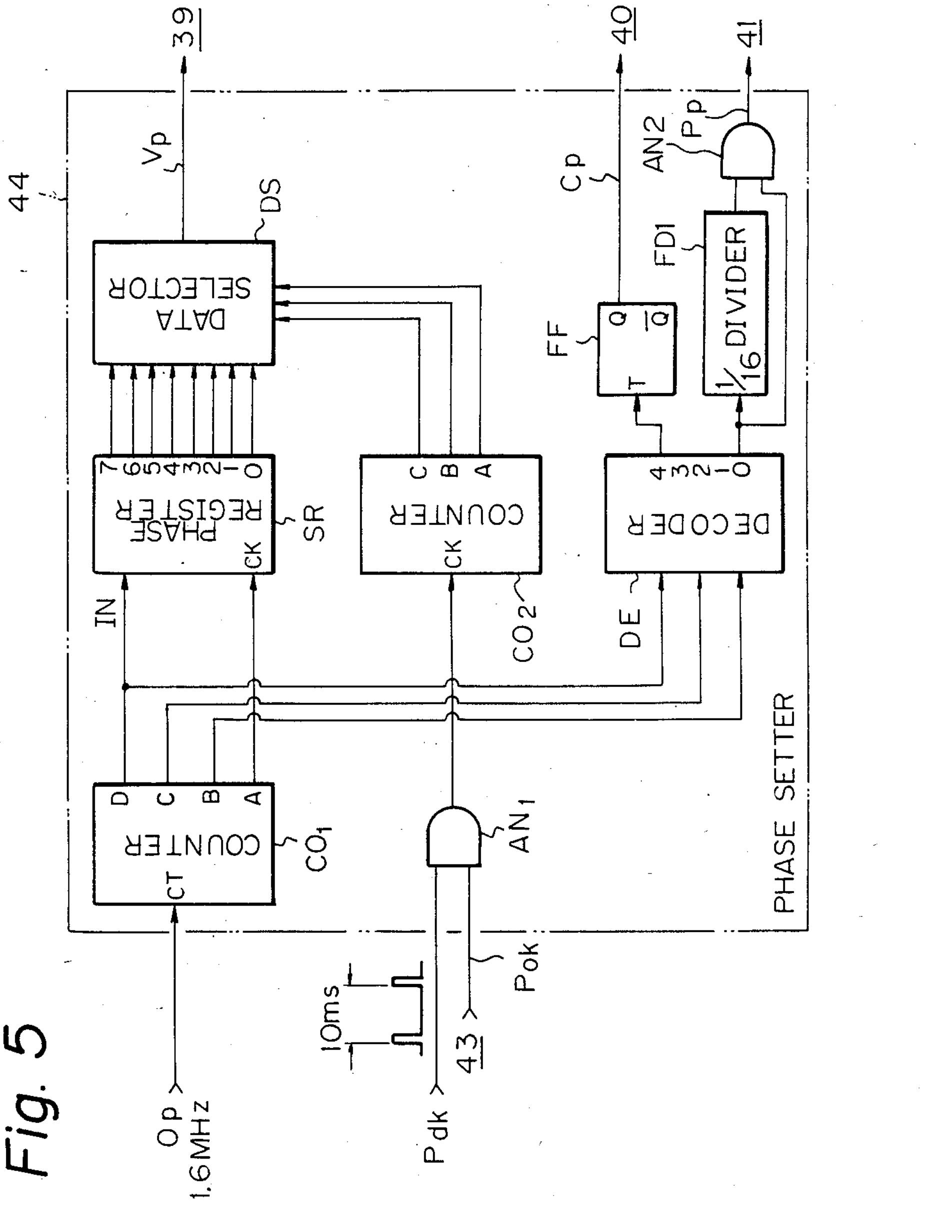
FIG. 5 is a block diagram of a phase setting circuit also included in the construction of FIG. 3.
Figure 6:
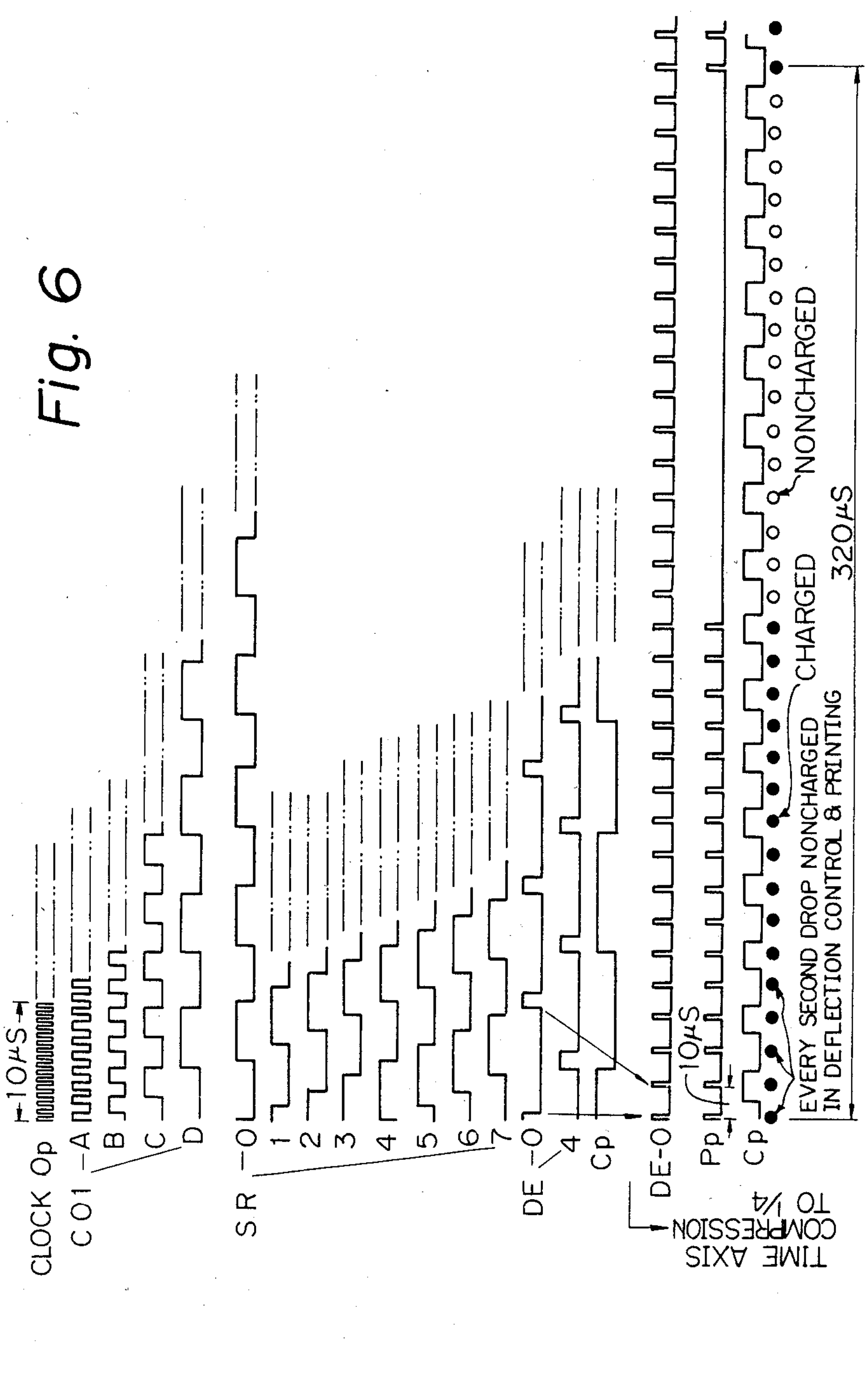
FIG. 6 is a timing chart representing various electrical signals delivered to and from the phase setting circuit.

A construction of a phase setting circuit 44 also included in the circuitry of FIG. 3 is shown in FIG. 5. Electrical signals appearing in various portions of the phase setter 44 are shown in FIG. 6. The phase setter 44 includes a counter $CO_1$ which receives and counts clock pulses Op whose frequency is 1.6 MHz. The counter $CO_1$ has counter code output bits A–D (A = first digit, . . . , D = fourth digit). The bit A is fed to a serial-in, parallel-out shift register SR as a shift pulse, while the bit D is applied to the shift register SR as an input signal. As a result, a train of pulses having a width D and sequentially shifted in phase by A appear at output terminals 0–7 of the shift register. One of the pulses at the terminals 0–7 is fed to a drive voltage generator 39 as a drive pulse Vp for the electrostrictive vibrator.

The output bits B and C are fed to a decoder DE together with the output bit D. While a pulse appearing at the first output terminal 0 of the decoder DE is fed to a frequency divider $FD_1$, a pulse appearing at the fifth output terminal 4 is fed to a T flip-flop FF. The Q output of the T flip-flop FF is delivered to a print charge voltage generator 40 as a charge timing signal Cp. The output of the 1/16 divider $FD_1$ is coupled to an AND gate $AN_2$ to be thereby shaped to the pulse width which appears at the output terminal 0 of the decoder DE. The output of the AND gate $AN_2$ is fed to a search charge voltage generator 41 as a phase search charge pulse Pp. As shown in FIG. 6, in the charge signal Pp, a train of 16 pulses appear followed by an interval corresponding to 16 pulses. The charge signal Pp intermittently appear at the period of 320 μsec. In contrast, the print charge timing signal Cp is a train of continuous pulses whose width (logical "1") is eight times the width of the pulses Pp.

In this particular embodiment, both the pulses Pp and Cp are fixed in phase. Meanwhile, the phase of the vibrator drive pulse Vp is shifted or changed depending on the shift register output, one of 0–7, which a data selector DS will select in response to a count code A–C fed thereto from a counter $CO_2$. That is, while the charge pulses are fixed in phase, separation of ink into a drop is shifted in phase.

Figure 7:
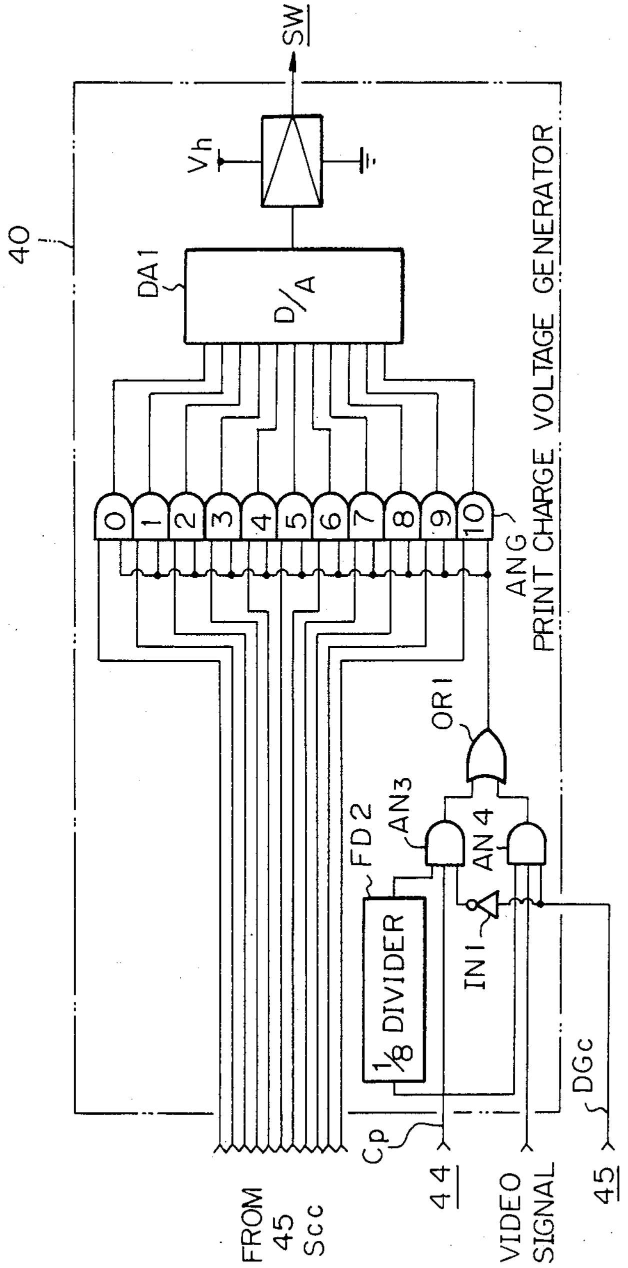
FIG. 7 is a block diagram of a print charge voltage generator included in the construction of FIG. 3.

Details of the print charge voltage generator 40 are shown in FIG. 7. The charge voltage generator 40 comprises a frequency divider $FD_2$, AND gates $AN_3$ and $AN_4$, an OR gate $OR_1$ and an inverter $IN_1$. During printing a charge voltage code Scc (having a plurality values corresponding in number to deflection steps) is switchingly set in an AND gate group ANG of a digital-to-analog (D/A) converter $DA_1$ in synchronism with pulses Pp. During a deflection adjustment, a charge pattern is formed as during a phase search.

Figure 8:
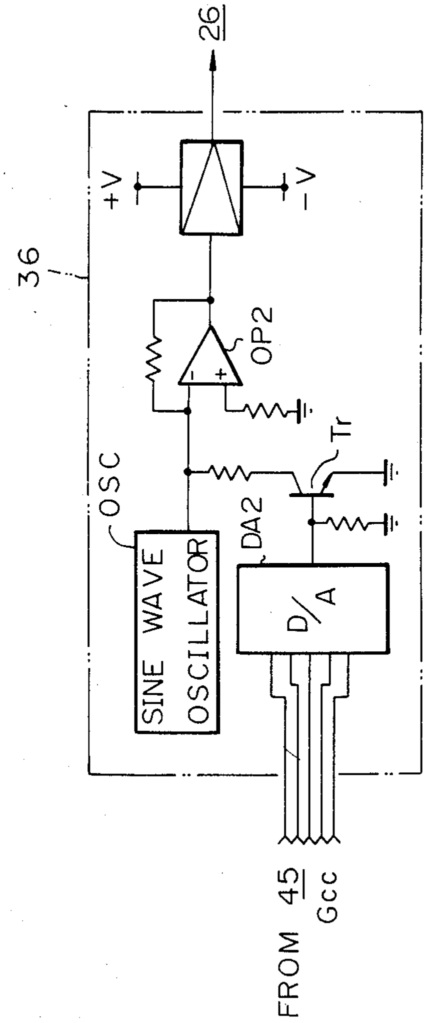
FIG. 8 is a block diagram of a pump driver also included in the construction of FIG. 3.

Referring to FIG. 8, a pump drive circuit 36 comprises an ink pressure setting means and deflection adjusting means. That is, the pump driver 36 is constructed to vary the ink pressure and thereby the flying velocity of a drop, so that the deflection amount may be adjusted in accordance with a flying velocity. The pump 26 is of the reciprocal drive type in which a solenoid is energized by an alternating current to drive a plunger in a reciprocal movement. Therefore, the delivery pressure of the pump 26 is varied by varying the solenoid energizing voltage level at the pump drive 36. In this circuit 36, an output voltage level of a sinusoidal wave oscillator OSC is adjusted by an op amp $OP_2$ and then fed to an output amplifier to prepare a solenoid energizing voltage for the pump 26. The gain of the op amp OP 2 is determined by the conductivity of a transistor Tr. When the gain code Gcc applied to a D/A converter $DA_2$ has a large value, the conductivity of the transistor Tr is high, the gain of the op amp $OP_2$ is small and, therefore, the delivery pressure (ink pressure) of the pump 26 is low. When the gain code Gcc has a small value, the conductivity of the transistor Tr is low, and the gain of the op amp $OP_2$ is large to increase the delivery pressure of the pump 26. While a charge voltage having a constant level is fed to the electrode, the deflection amount is large if the ink pressure is low and small if the ink pressure is high. These are noteworthy facts. Stated another way, the deflection amount is large if the gain code Gcc fed to the pump driver 36 is large and small if it is small.

Figure 9:
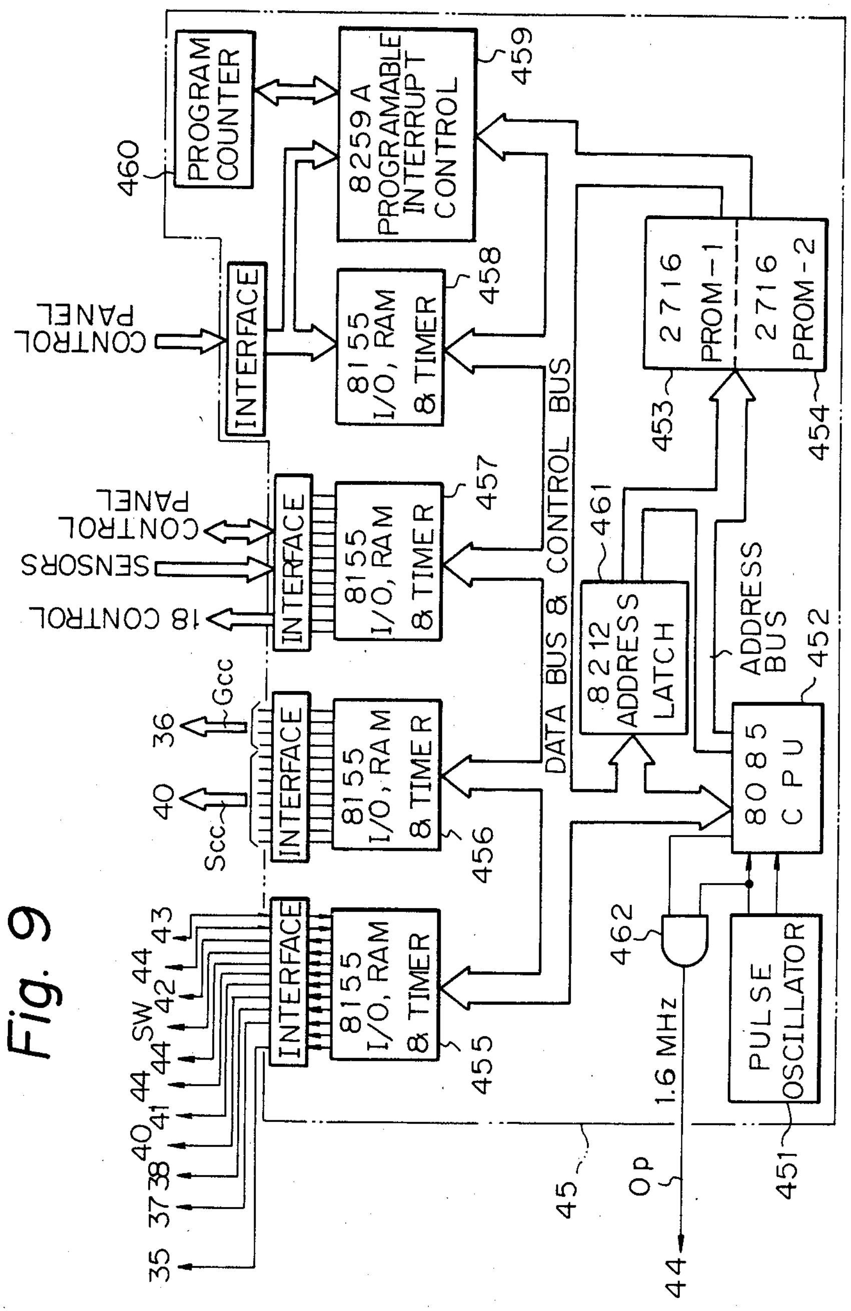
FIG. 9 is a block diagram of a microcomputer unit shown in FIG. 3.

A microcomputer unit 45 serving as an electronic control in this embodiment is shown in FIG. 9. The microcomputer unit 45 comprises a pulse generator 451, a microprocessor (microcomputer) 452, programable ROMs (PROMs) 453 and 454 capable of writing or erasing data using ultraviolet rays, RAMs 455–458 with input/output ports and timers, a programable interrupt controller 459, a programable counter 460, and an address latch 461.

Sensor signal lines, control signal lines and data lines are connected to the RAMs 455–458 via amplifiers, inverters or line interfaces. Such lines are necessary for all the ink ejection control, phase search control, deflection set control, print charge control, carriage drive control, sheet feed control and other ink jet printer controls. The PROMs 453 and 454 store program data for executing such ink jet printer controls.

Figure 10A:
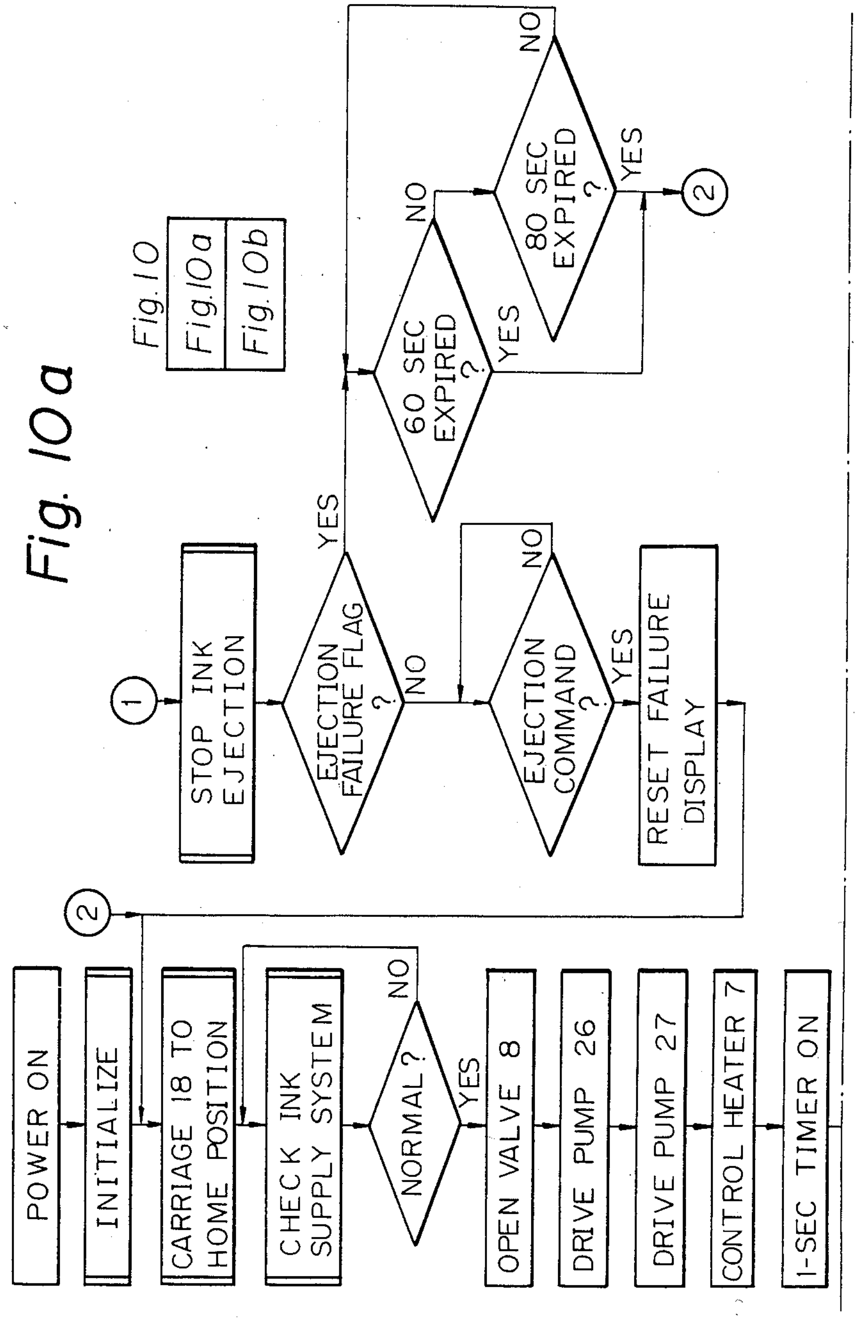
FIG. 10 is a flowchart demonstrating an ink jet printer control performed by the microcomputer unit shown in FIGS. 3 and 9.
Figure 10B:
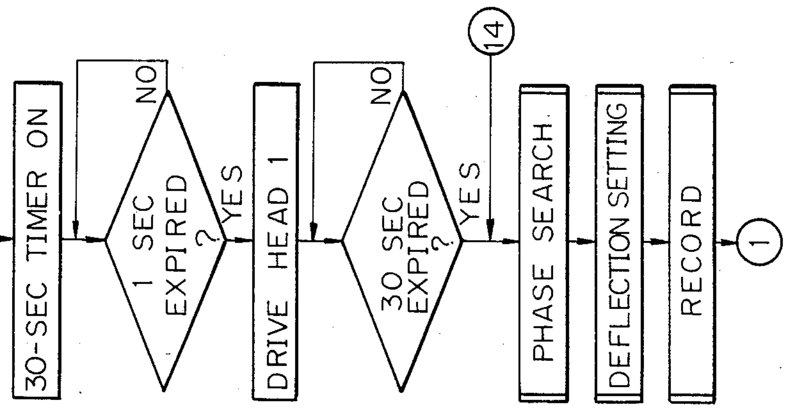
Figure 11A:
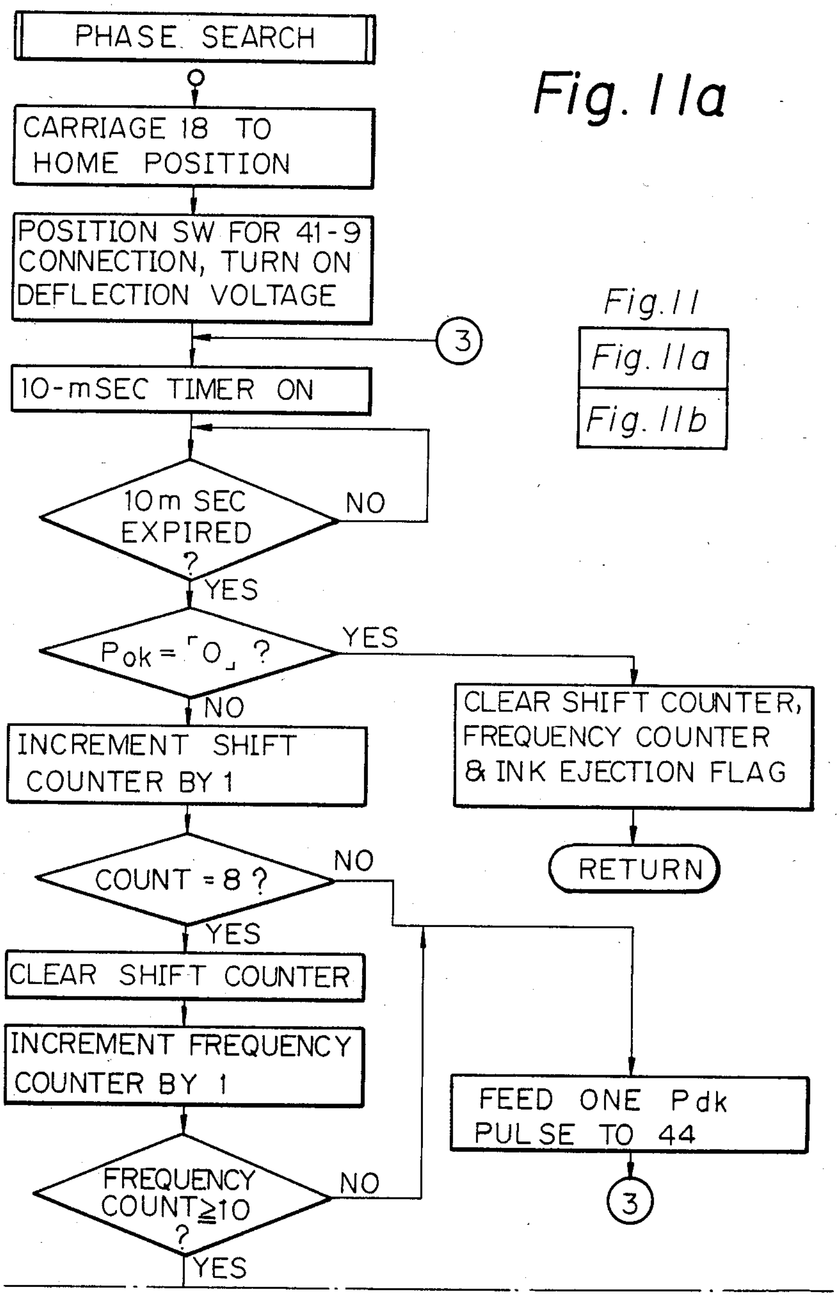
FIG. 11 is a flowchart demonstrating a phase search control also performed by the microcomputer unit.
Figure 11B:
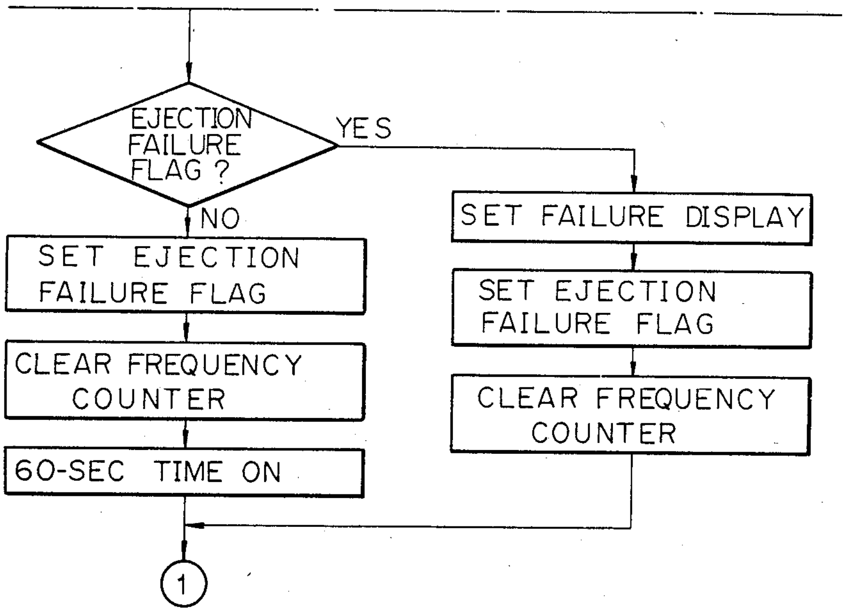
Figures 1, 12A:
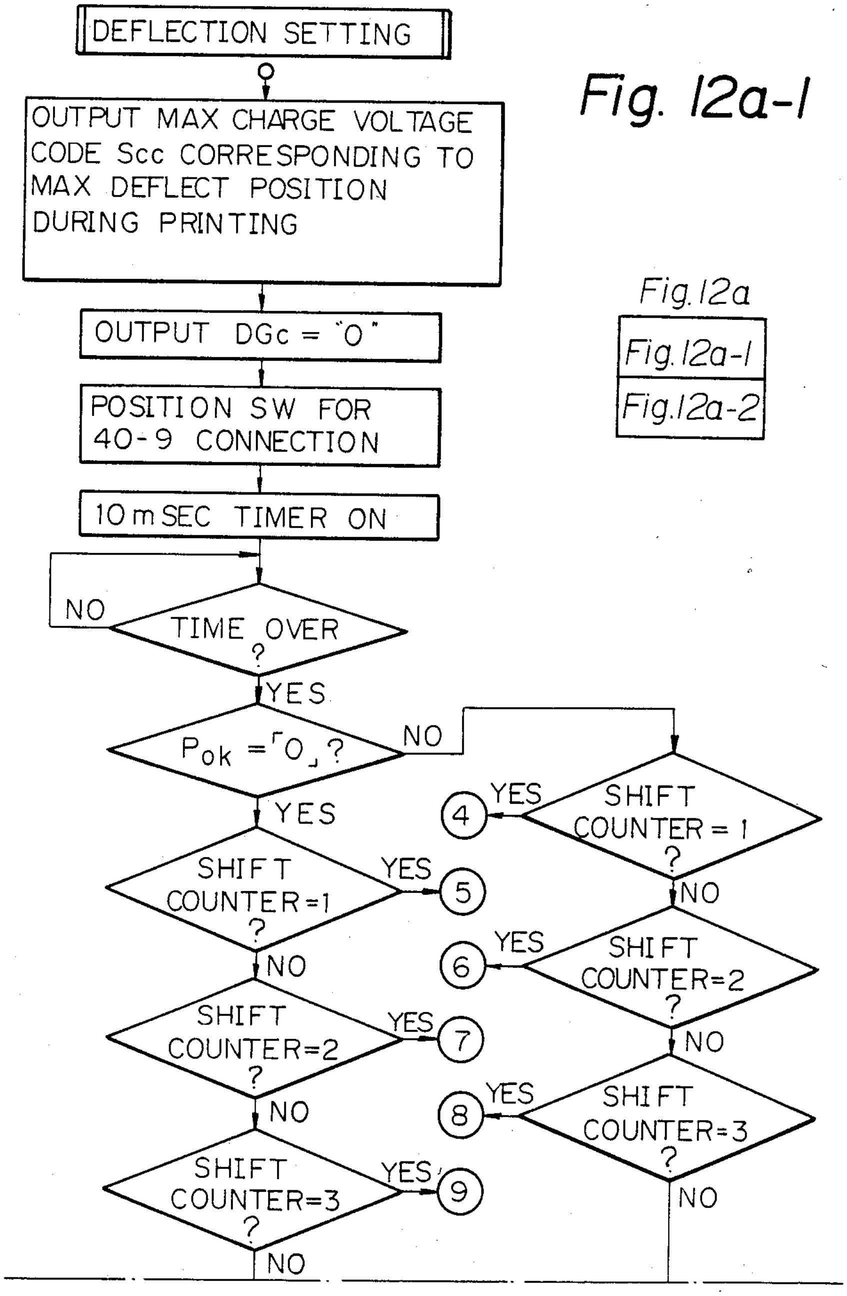
FIGS. 12*a* and 12*b* are flowcharts demonstrating a deflection set control also performed by the microcomputer unit.
Figures 2, 12A:
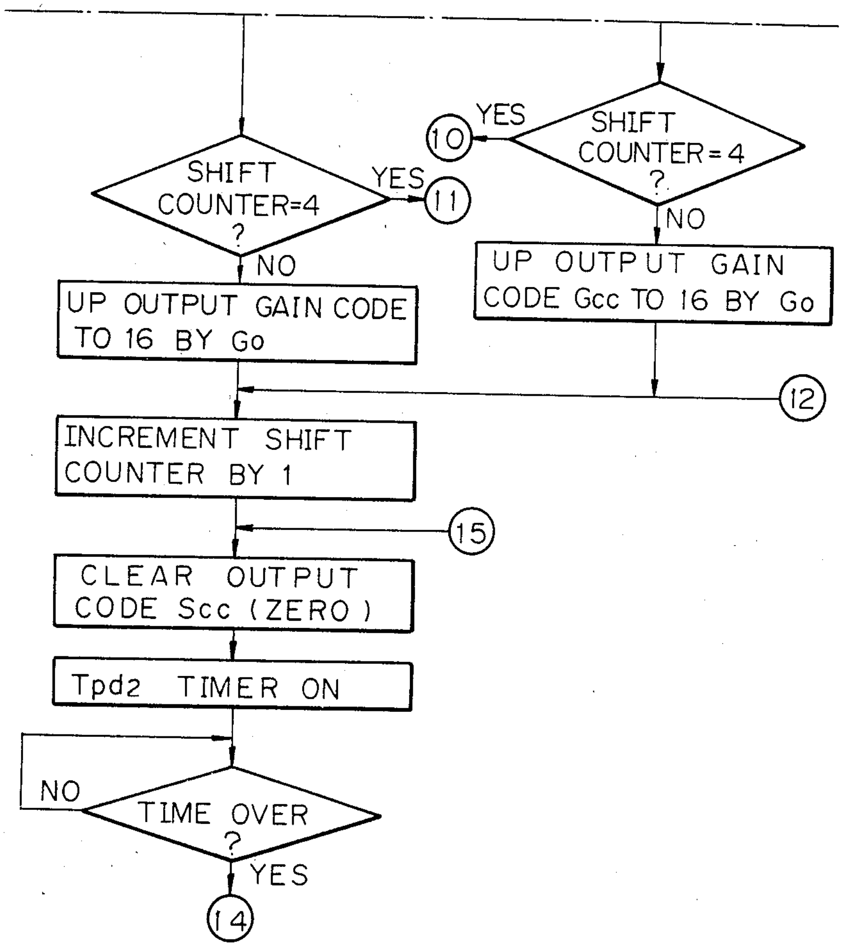
Figures 1, 12B:
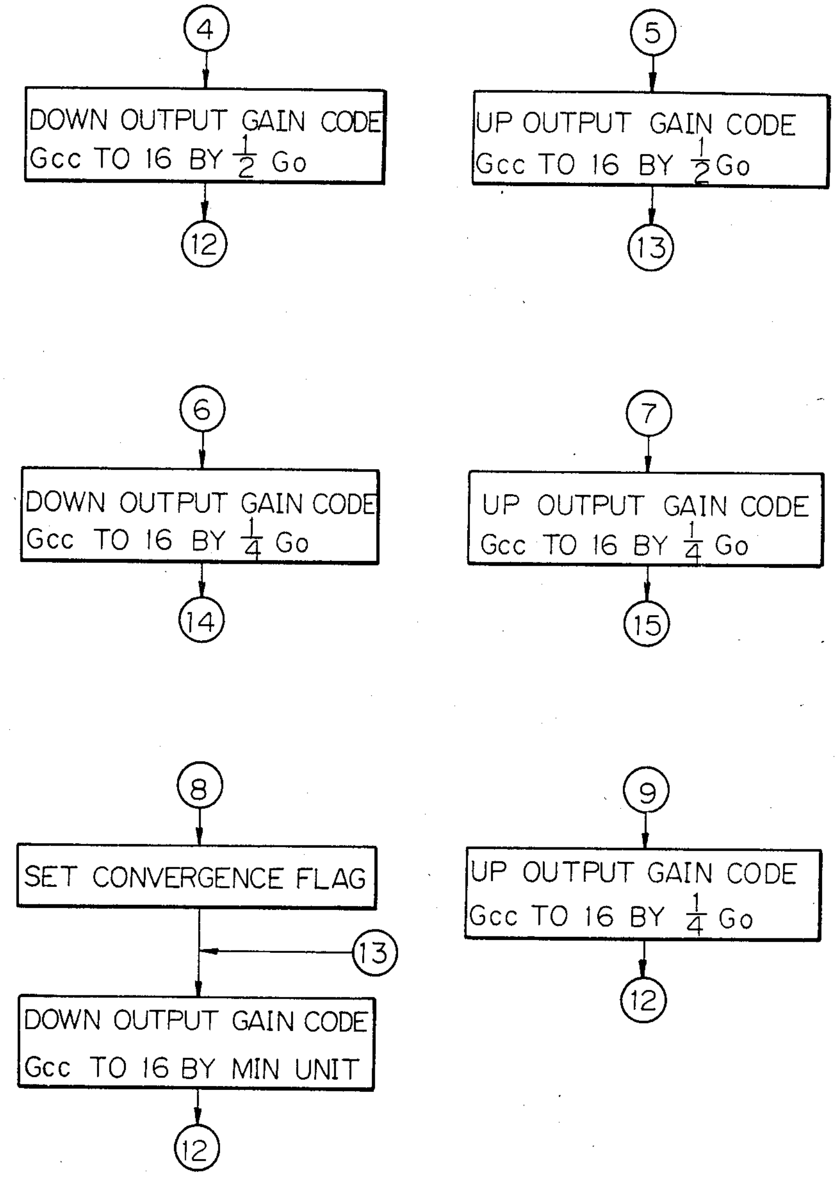
Figures 2, 12B:
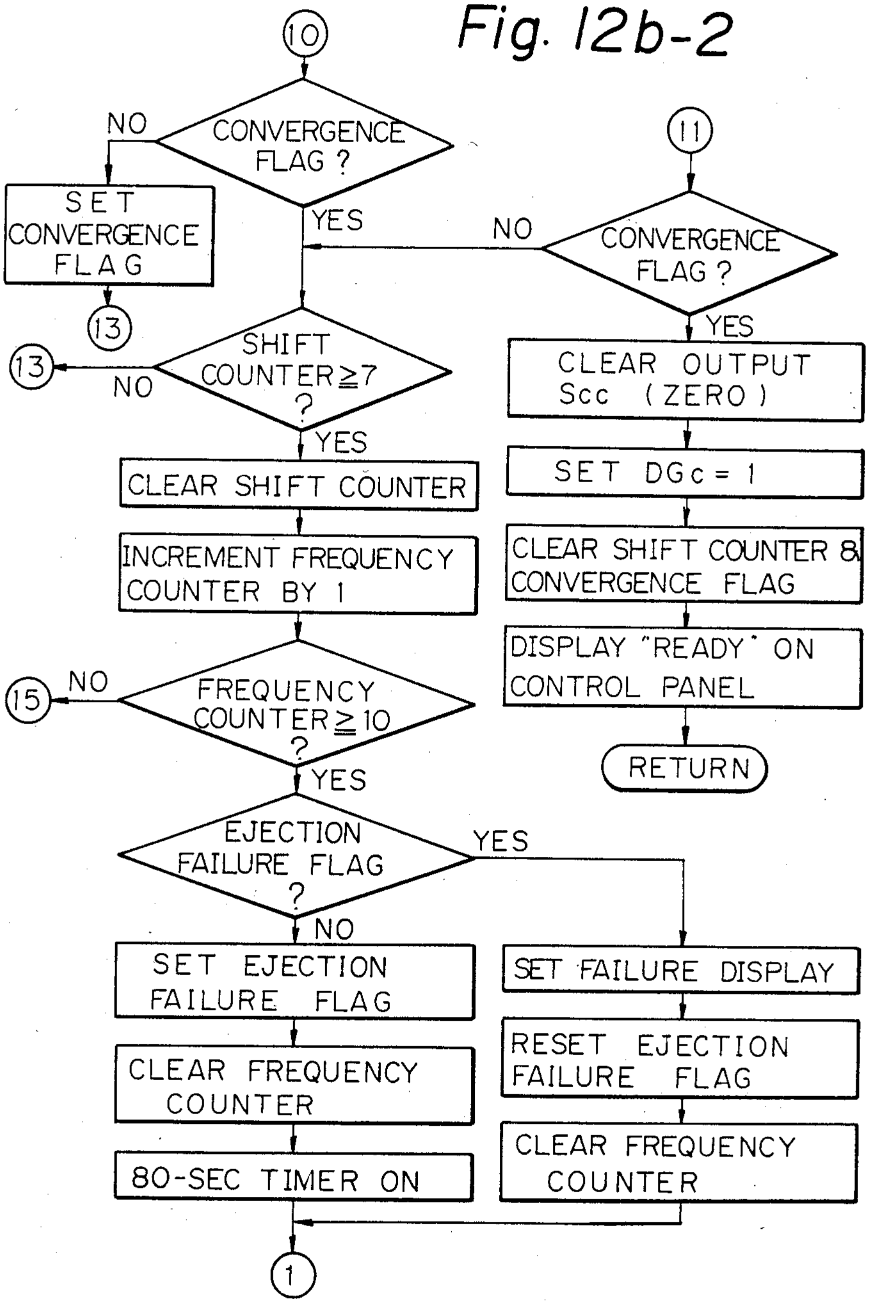

FIG. 10 shows a control outline of the ink jet printer controls (main flow) based on the program data; FIG. 11 shows details of the phase search control (a subflow); and FIGS. 12*a* and 12*b* show details of the deflection set control (a subflow).

First, a reference is made to FIG. 10 for outlining the ink jet printer controls. When supplied with power, the microcomputer 45 reads out the head of the control program, initializes the input/output ports, and thereby sets up a standby condition (ink ejection stopped and deflection voltage cut off). Then, the microcomputer 45 moves the carriage 18 to the home position (where the head 1 faces the gutter 22).

Next, the microcomputer 45 checks a condition of the ink supply system by referring to output signals of various sensors. If the ink supply system is faulty, the microcomputer 45 provides a status display representing the failure, and awaits recovery. If the ink supply system is normal or has become normal, the microcomputer 45 activates the valve 8 to communicate the accumulator 4 to the filter 25, and delivers a reference gain code Gcc to the D/A converter $DA_2$ of the pump driver 36 to drive the pump 26, a pump drive command to a pump driver 35 for driving the pump 27, and an ink temperature control command to a heater driver 38. Thereafter, the microcomputer 45 turns on a 1-sec timer and a 30-sec timer.

As one second expires, an AND gate 462 (FIG. 9) is enabled to supply the phase setter 44 with clock pulses Op whose frequency is 1.6 MHz. This causes clock pulses Vp to be fed to the drive voltage generator 39 which drive the electrostrictive vibrator of the head 1, thereby applying pressure vibration to the ink inside the head 1. Then, the stream of ink ejected from the head 1 is separated into a string of drops which are directed toward the gutter 5.

On the expiration of 30 seconds counted by the 30-sec timer, the microcomputer 45 performs a phase search, then a deflection control, and then a print control because the ink pressure has been stabilized at a constant level. Thereafter, the microcomputer 45 stops the ink ejection and awaits another ink ejection command.

On entering into the print control, the microcomputer 45 triggers an 80-sec timer. After the expiration of 80 seconds, the operation advances to a phase search as soon as the recording operation reaches a predetermined stage to leave off, and then to a deflection control. Thereafter, the microcomputer 45 turns on the 80-sec timer again to return to the print control. Another phase search and deflection control will be effected on the lapse of 80 seconds. This is the condition set control which occurs at a predetermined period.

The phase search control will be described with reference to FIG. 11. First, the microcomputer 45 moves the carriage 18 to the home position, actuates a switch SW to connect the charging electrode 9 to the search charge voltage generator 41, delivers a deflection voltage output command to a deflection voltage power source circuit 42, and awaits the expiration of 10 msec. Due to the position of the switch SW, search charge pulses prepared by amplifying the search charge pulses Pp (see FIG. 6) are applied to the electrode 9. That is, phase search charge pulses having a period of 10 sec and appearing in consecutive trains at a period of 320 μsec are fed from the search charge voltage generator 41 to the charging electrode via the switch SW.

Assuming that the count code of the counter $CO_2$ is "000", the pulse appearing at the output terminal 0 of the shift register SR has been fed to the drive voltage oscillator 39 as a drive pulse Vp and an ink drop forms itself in a phase corresponding to the period and phase of the drive pulse Vp (phase corresponding to Pp). If the formation of the ink drop is timed to the application of the pulse Pp, it will become charged to the negative polarity to impinge on the electrode 13 inside the gutter 22. That is, among the ink drops separated at the period of the pulses Pp, 16 consecutive drops are negatively charged and the next 16 consecutive drops are not charged, thereby developing a charge pattern having a period of 320 sec. In this case, therefore, the potential of the electrode 13 undergoes a variation similar to that of the charge pattern.

However, due to the floating capacity of the shield wire 29 and the time constant of the resistor R, the field effect transistor FET in the charge detector 43 has its base potential varied in the manner of a sinusoidal wave or an envelope having a period of 320 μsec. Such a sinusoidal voltage is inverted by the field effect transistor FET, further inverted and amplified by the op amp $OP_1$, and applied to the high-pass filter HPF at the positive level. The high-pass filter HPF cuts off noise whose period is not longer than 320 μsec. The integrator IGR smooths the sinusoidal wave having the 320 μsec period to stabilize it at the DC constant level. The comparator COM compares the DC voltage with a reference voltage. When the DC voltage is higher than the reference voltage and thereby represents "charged", the output of the comparator COM becomes (logical) "0" level; if ink drops have not been charged or incompletely if charged, the output of the comparator COM is "1" level and this output is fed to the microcomputer 45 as well as to the AND gate $AN_1$ of the phase setter 44.

To summarize the above operation, ink drops are charged if their separation phase is coincident with the pulses Pp and are not charged if not. The output Pok of the charge detector 43 becomes "0" level if ink drops are charged and remains "1" level if not. On the lapse of 10 seconds, the microcomputer 45 checks the output Pok of the charge detector 43 and, if it is "0" level, clears counters and flags to advance to a deflection control determining that the separation phase of ink into a droplet is properly related with the phase of the search charge pulses. If the output Pok is "1" level, accurate charging is unattainable due to the difference in phase between the search charge pulses and the separation of ink into drops. Hence, the microcomputer 45 increments a shift counter (program counter) by one and supplies the phase setter 44 with one Pdk pulse.

On the supply of one Pdk pulse to the phase setter 44, the counter $CO_2$ is incremented to shift the phase of the drive pulse Vp with a 1-step delay. That is, the counter $CO_2$ counts it up to cause the data selector DS to select a pulse at an output terminal $i+1$ of the shift register SR, instead of the pulse at the output terminal i. The counter $CO_2$ is cyclically operated. So long as the ink ejection is normal, an ink drop will be charged to make the output of the comparator COM "0" level while a pulse appearing at any one of the outputs 0–7 of the shift register SR is being applied to the drive voltage generator 39, that is, in the course of one cycle or eight times of phase shift.

After delivering one Pdk pulse to the circuit 44, the microcomputer unit 45 triggers the 10-msec timer to await the expiration. On the lapse of the 10 msec, the microcomputer 45 checks Pok and, if it is "0" level, advances to a deflection control but, if otherwise, increments the shift counter, supplies one Pdk pulse to the phase setter 44, and triggers the 10-msec timer. In this manner, the microcomputer 45 continuously supplies the phase setter 44 with upcount pulses Pdk until the output of the charge detector 43 becomes "0" level. As the count of the shift counter reaches a count "8", the microcomputer 45 increments a frequency counter (program counter) determining that no ink drop was adequately charged in the one cycle of ink separation phase shifts. Again, the microcomputer unit 45 performs a phase search of the next cycle. The procedure which is to follow will be understood by analogy.

The content of the frequency counter, therefore, represents the number of cycles executed, where one cycle comprises eight times of ink separation phase shift. In this particular embodiment, if Pok does not become "0" level (adequate charge) even after 10 cycles of phase searches, the microcomputer 45 determines that the ink ejection is faulty, sets an ink ejection failure flag, clears the frequency counter, triggers a 60-sec timer, and jumps to the ejection stop step in the main flow (FIG. 10).

In the ink ejection stop stage, the microcomputer 45 delivers a deflection voltage cut-off command to the deflection voltage source 42, deactivates the pumps 26 and 27, deenergizes the valve 8 to communicate the accumulator 4 to the reservoir 28, deenergizes the heater drive 38, and disenables the AND gate 462. This causes the ink ejection to be stopped, and the supply of charge voltage, deflect voltage and drive voltage to be interrupted. Thereafter, the microcomputer 45 awaits the expiration of 60 seconds, then advances to the step next to the initialization of the main flow (FIG. 10), and then resumes the phase search (FIG. 11) through the main flow. As in the previous phase search, if Pok does not become "0" level after 10 cycles of phase searches, the microcomputer 45, because the ink ejection failure flag has been set, sets a failure display, resets the ink ejection flag, clears the frequency counter, and advances to the ink ejection step. This time, the ink ejection failure flag has not been set so that the microcomputer 45 stops ink ejection while continuing the failure display, until an injection command is delivered thereto. As the operator enters an ink ejection command, the microcomputer 45 resets the failure display and starts on the step next to the initialization in the main flow. As Pok becomes "0" level after the second ink ejection and phase search, the microcomputer 45 determines that an adequate charge has been provided and thereby clears the shift counter, frequency counter and ink ejection failure flag to perform a deflection control.

Referring to FIGS. 12*a* and 12*b* which show the deflection set control, the microcomputer 45 supplies the print charge voltage generator 40 with a code Scc allocated to the maximum deflection position, out of all the charge voltage codes allocated to the individual printing steps (drop deflection steps). Also, the unit 45 supplies the print charge voltage generator 40 with a signal DGc="0" or record charge command (DGc="1" for printing), and actuates the switch SW to connect the print charging voltage generator 40 to the charging electrode 9. In this instance, the reference gain code Gcc set in the event of phase search still exists in the pump driver 36.

Due to the "0" DGc level, the print charge voltage generator 40 disenables the AND gate $AN_4$ and enables the AND gate $AN_2$. This causes pulses to appear at the output terminal of the OR gate $OR_1$ in such a pattern that a train of eight pulses Cp is followed by an interval equal to a train of eight pulses Cp which in turn is follows by another train of consecutive eight pulses Cp. These pulses are fed to the AND gate group ANG. Therefore, due to the connection of the voltage generator 40 to the charging electrode 9 via the switch SW, the charging electrode 9 is supplied with a record charge voltage for the maximum deflection level which is synchronous with a record charge signal pulse Cp, whose duration is eight times the duration of a pulse Pp, and appears in a period of eight consecutive pulses Cp but not in a period of the next eight consecutive pulses Cp.

The resultant drop charging pattern is such that in a string of 16 drops (160 μsec) eight are charged in an alternate manner and the next string of 16 drops (160 μsec) are not charged at all, i.e. a charge pattern whose period is 320 μsec. It is noteworthy here that, while in the phase search the charge voltage (corresponding to Pp) is supplied in such a manner as to charge a string of consecutive 16 drops, in the deflection adjustment a charge voltage synchronous with a pulse Cp is supplied and, because the pulse Cp is one half the frequency of the pulse Pp, drops are formed one for each pulse Pp. In this manner, charging occurs in the charge pattern whose one period is 320 μsec in the case of the deflection set control as well.

On the lapse of 10 msec, the microcomputer 45 checks the output Pok of the charge detector 43. If Pok="0", the unit 45 increases the output gain code to the pump driver 36 by Go, and increments the shift counter by one; if Pok="1", reducing the output gain code by Go, incrementing the shift counter by one, clearing the output code Scc to the circuit 40 in order to stop charging drops, triggering a timer, and returning to the phase search on the lapse of a time $Tpd_2$. Here, the time $Tpd_2$ is a time period from the instant when the output gain code Gcc is increased or decreased by Go to the instant when an ink pressure corresponding to the resulting output gain code Gcc appears at the nozzle of the head 8 and becomes stabilized thereat. The return to the phase search is effected because the change in ink pressure influences the proper charge voltage (in this embodiment, drive voltage phase) and this requires an adequate phase to be reestablished for the new ink pressure. It should be noted that on the entry into a phase search during the deflection adjustment, the gain code to the pump driver 36 is assumed to have been predetermined by the deflection adjustment and is not switched to the reference code.

After the phase search, the microcomputer 45 again enters into deflection set control by checking Pok after 10 msec. This time, the shift counter is holding the count "1" so that the microcomputer 45 reduces the output gain code Gcc by $\frac{1}{2}$ at a step 4 in FIG. 12*b* if Pok="1", while increasing the output gain code Gcc by $\frac{1}{2}$ at a a step 5 in FIG. 12*b* if Pok="0". This is followed by a phase search as previously mentioned. When the count of the shift counter is "2", the output gain code Gcc is changed to $\pm\frac{1}{4}$Go as represented by steps 6 and 7 in FIG. 12*b*. Because Go=8 in this embodiment, $\frac{1}{4}$Go=2 and, therefore, the next $\frac{1}{8}$Go is "1 (minimum unit change)". Therefore, when the count of the shift counter is "3" (meaning that the change $\pm$Go $\pm\frac{1}{2}$Go $\pm\frac{1}{4}$Go has been completed), the output gain code is increased by $\frac{1}{4}$Go in order to cause a drop to reach a position above the upper end of the electrode 13, as represented by a step 9 in FIG. 12*b*. If Pok="1", the microcomputer 45 sets a convergence flag and reduces the output gain code by the minimum unit at a step 8 shown in FIG. 12*b*.

When Pok="0" while the shift counter is holding "4" or larger value, the convergence flag set may be regarded as indicating that Pok="1" held last time and drops have come to impinge on the electrode 13 due to the minimum unit gain change. Then, the microcomputer 45 makes Scc="0" and DGc="1", clears the shift counter and convergence flag, displays "record ready" on a control panel (end of deflection set control).

If the convergence flag has not been set, the microcomputer unit 45 regards the situation as still representing impingement of drops on the electrode 13 and, therefore, reduces the gain by the minimum unit at a step 13 shown in FIG. 12*b*. If Pok="1", the unit 45 refers to the convegence flag at a step 10 of FIG. 12*b* and, if it is set, advances to the step 13 and, if not, sets the convergence flag before advancing to the step 13. Usually, for Go=8, the path of charged drops is changed from one which misses the upper end of the electrode 13 to one which impinges on the electrode 13 by the minimum unit decrease of the gain code within six consecutive gain changes, i.e. $\pm$Go $\pm\frac{1}{2}$Go $\pm\frac{1}{4}$Go $\pm\frac{1}{4}$Go $-1-1$. As the counter is incremented to "7" or more, therefore, the microcomputer 45 takes the situation as involving the possibility of failure (usually, failure in ink ejection, flying velocity), increments the frequency counter by one, returns to the step 15 in FIG. 12*b*, and then repeats another deflection set control.

In the course of the repeated deflection adjustments, the frequency counter may reach the count "10". Then, the unit 45, determining that the condition is faulty, sets the ink ejection failure flag, clears the frequency counter, and triggers a 40-sec timer which is shorter than the period of ordinary condition set controls which occur during printing, thereby advancing to the ink ejection stop in the main flow (FIG. 10). On the lapse of 40 seconds, the unit 45 starts on a second deflection set control. Again, when the deflection of drops has converged to the upper end of the electrode 13 while the counter is "10,"the unit 45 interrupts the charging operation (sets Scc="0"), sets DGc="1" (record charging), and displays "record ready" on the control panel.

If the frequency counter exceeds "10" and the convergence of drops to the upper end of the electrode 13 is unachieved even after the second deflection set control, the microcomputer 45 sets a failure display, resets the ink ejection failure flag, clears the frequency counter, and performs the ink ejection stop in the main flow of FIG. 10. In this instance, because the ink ejection failure flag has been reset, the unit 45 maintains the ink ejection stop condition until an ink ejection command is entered through the control panel. As the operator removes the failure and then enters an ink ejection command, the unit 45 resets the failure display to perform the ink ejection set control, phase search control and deflection set control, which follow the initialization.

Completing the controls mentioned above, the microcomputer 45 advances to the record control. In the record control, DGo="1" has been set so that the AND gate $AN_4$ in the print charge voltage generator 40 has been enabled and the AND gate $AN_2$ disenabled. Under this condition, so long as the video signal is "1" commanding recording of data, the record charge signal Cp directly appears at the output terminal of the OR gate $OR_1$. When the video signal is "0", the AND gate $AN_4$ intercepts the pulses Cp while the output "0" of the OR gate $OR_1$ disenables the AND gate group ANG.

Timed to the pulses Cp (Op), the microcomputer unit 45 sequentially switches the charge voltage code to the print charge voltage generator 40 in a predetermined order. As previously mentioned, the unit 45 in the record charge control triggers the 80-sec timer and, on the lapse of 80 seconds, interrupts the record charge control as soon as the recording operation reaches a predetermined stage to leave off. Then, the unit 45 advances to the step next to the initialization in the main flow of FIG. 10, checks the conditions of various portions, controls the phase search and deflection adjustment, returns to the record control triggering the 80-sec timer, and executes the previously described procedure after 80 seconds. This is repeated thereafter. In short, the unit 45 performs condition set controls at a predetermined period.

While in the embodiment shown and described the phase of charge voltage pulses has been fixed and the drop separation phase shifted in order to adequately charge ink droplets, the same effect is attainable even by fixing the droplet separation phase and shifting the charge voltage pulse phase. Meanwhile, in the deflection control, the ink pressure has been adjusted so that drops having a predetermined charge follow a predetermined path. Instead, the ink pressure may be held at a certain fixed level in which case the deflection of droplets will be adjusted by controlling the charge voltage code fed to the print charge voltage generator 40 and/or the amplification gain of the generator 40 or adjusting the deflection voltage. In any case, when the initial phase search has failed to properly charge droplets, the ink ejection is interrupted for a moment and automatically resumed to perform a phase search. In the deflection control, too, if the initial deflection control has failed to attain an adequate deflection, the ink ejection is temporarily stopped and automatically resumed to effect a deflection control.

Generally, in a deflection control type ink jet recorder, an abnormal condition in the initial stage of ink ejection is often eliminated while the ink ejection is continued. Particularly, abnormal ink ejection in the initial stage of operation is often overcome by stopping the ink ejection for a moment and then starting it over again. In this respect, the embodiment shown and described features a high probability of automatic recovery of normal ink ejection which reduces operator's work for inspection, repair and the like while enhancing the efficient use of such a printer.

Various modifications will become possible for those skilled in the art after receiving the teachings of the present disclosure without departing from the scope thereof.

What is claimed is:

1. A deflection control type ink jet recording apparatus comprising:

an ink ejection head having an ink ejection nozzle and a vibrator for applying pressure vibration having a predetermined period to ink which is communicated to the ink ejection nozzle;

a pump for supplying the ink under pressure to the ink ejection head;

a charging electrode for applying a charging electric field to the ink which is ejected from the nozzle;

a deflection electrode for applying a deflecting electric field to a charged ink drop;

charge voltage applying means for applying a charge voltage to the charging electrode;

electrode means for detecting a charged ink drop;

charge detector means for generating an electrical signal which represents presence/absence of a charged drop, said charge detector means being connected to said electrode means for detecting a charged ink drop; and electronic control means for performing a condition set control which sets a predetermined charging and deflection condition for an ink drop and, when failed to establish the predetermined condition by one condition set control, performing a second condition set control after a predetermined period of time;

the condition set control comprising a phase search control for predetermining one of a separation phase of ink drops and a phase of charge pulses relative to the other, and a deflection amount set control which includes at least one of a charge amount control, an ink pressure control and a deflection voltage control;

the electronic control means being constructed to, when failed to predetermine an adequate phase by one cycle of phase shifts in the phase search control, perform a second phase search control after a predetermined period of time and, when failed to predetermine an adequate deflection by a predetermined number of ink pressure changes in the deflection set control, perform a second deflection set control after a predetermined period of time.

2. A deflection control type ink jet recording apparatus having an ink ejection head equipped with an ink ejection nozzle and a vibrator for applying pressure vibration having a predetermined period to ink which is communicated to the ink ejection nozzle, a pump for supplying ink under pressure to the ink ejection head, a charging electrode for applying a charging electric field to ink ejected from the nozzle, and a deflection electrode for applying a deflecting electric field to a charged ink drop, said ink jet recording apparatus comprising:

charge voltage generator means for generating a record charge pulse equivalent in period to the pressure vibration and having a comparatively large width, and a search charge pulse common in period to and smaller in width than the record charge pulse, said charge voltage generator means selectively supplying and charg electrode with the record charge pulse and the search charge pulse;

electrode means for detecting a charged ink drop;

charge detector means for generating an electrical signal representing the presence/absence of a charged ink drop, said charge detector means being connected to said electrode means for detecting a charged ink drop; and electronic control means for performing an ink ejection control inclusive of a start and a stop of operation of the pump, and a phase search control which predetermines one of a separation phase of ink drops and a phase of charging pulses relative to the other, said control means being constructed to, when failed to predetermine an adequate phase by at least one cycle of phase shifts in the phase search control, temporarily stop ink ejection and, after a predetermined period of time, resume ink ejection for a second phase search control.

* * * * *